(12) United States Patent
Imai et al.

(10) Patent No.: US 9,139,450 B2
(45) Date of Patent: Sep. 22, 2015

(54) PROCESS FOR PRODUCING FUEL CELL CATALYSTS, AND FUEL CELL CATALYST

(75) Inventors: Takuya Imai, Chiba (JP); Ryuji Monden, Chiba (JP); Toshikazu Shishikura, Chiba (JP)

(73) Assignee: SHOWA DENKO K.K., Tokyo (JP)

(*) Notice: Subject to any disclaimer, the term of this patent is extended or adjusted under 35 U.S.C. 154(b) by 1031 days.

(21) Appl. No.: 12/934,198

(22) PCT Filed: Mar. 23, 2009

(86) PCT No.: PCT/JP2009/055655
§ 371 (c)(1),
(2), (4) Date: Sep. 23, 2010

(87) PCT Pub. No.: WO2009/119497
PCT Pub. Date: Oct. 1, 2009

(65) Prior Publication Data
US 2011/0053049 A1    Mar. 3, 2011

(30) Foreign Application Priority Data
Mar. 24, 2008  (JP) ................ 2008-074827

(51) Int. Cl.
*B01J 27/00*  (2006.01)
*C01G 33/00*  (2006.01)
(Continued)

(52) U.S. Cl.
CPC .............. *C01G 33/006* (2013.01); *C04B 35/58* (2013.01); *C04B 35/58007* (2013.01); *C04B 35/58021* (2013.01); *C04B 35/58035* (2013.01); *H01M 4/9008* (2013.01); *B01J 27/24* (2013.01); *B01J 37/00* (2013.01); *C01P 2002/72* (2013.01); *C01P 2002/89* (2013.01); *C01P 2006/40* (2013.01); *C01P 2006/80* (2013.01);
(Continued)

(58) Field of Classification Search
CPC ................. H01M 4/9008; C04B 35/58; C04B 2235/422; C04B 2235/42; C04B 2235/32; C01G 33/066; C01P 2002/72; C01P 2002/80; B01J 27/24
USPC ......................................... 429/523
See application file for complete search history.

(56) References Cited

U.S. PATENT DOCUMENTS 5,811,624 A    9/1998  Hantzer et al.
7,541,012 B2   6/2009  Yeung et al.
(Continued)

FOREIGN PATENT DOCUMENTS

JP    11-512393 A      10/1999
JP    2003-342058 A    12/2003
(Continued)

OTHER PUBLICATIONS

Doi et al. "Zirconium-Based Compounds for Cathode of Polymer Electrolyte Fuel Cell", J Electrochem Society, 2007, 154 (3), pp. B362-B369.
(Continued)

*Primary Examiner* — Milton I Cano
*Assistant Examiner* — Stephen Yanchuk
(74) *Attorney, Agent, or Firm* — Sughrue Mion, PLLC

(57) ABSTRACT

A process for producing fuel cell catalysts includes a step (I) of heating a carbonitride of a transition metal in an inert gas containing oxygen, and a step (II) of heating the product from the step (I) in an inert gas that does not substantially contain oxygen.

5 Claims, 7 Drawing Sheets

(51) Int. Cl.
  *H01M 4/90* (2006.01)
  *C04B 35/58* (2006.01)
  *B01J 37/00* (2006.01)
  *B01J 27/24* (2006.01)

(52) U.S. Cl.
  CPC .......... *C04B 2235/3232* (2013.01); *C04B 2235/3244* (2013.01); *C04B 2235/3251* (2013.01); *C04B 2235/422* (2013.01); *C04B 2235/46* (2013.01); *C04B 2235/6584* (2013.01); *C04B 2235/6585* (2013.01); *C04B 2235/661* (2013.01); *C04B 2235/9692* (2013.01); *Y02E 60/50* (2013.01)

(56) References Cited

U.S. PATENT DOCUMENTS

| | | | |
|---|---|---|---|
| 8,496,903 B2 | 7/2013 | Monden et al. | |
| 2004/0204504 A1* | 10/2004 | Malek et al. | 518/717 |
| 2007/0292744 A1* | 12/2007 | Lopez et al. | 429/44 |
| 2008/0145744 A1* | 6/2008 | Kim et al. | 429/46 |
| 2009/0130502 A1* | 5/2009 | Liu et al. | 429/13 |
| 2010/0227253 A1 | 9/2010 | Monden et al. | |

FOREIGN PATENT DOCUMENTS

| | | |
|---|---|---|
| JP | 2006-107967 A | 4/2006 |
| JP | 2007-031781 A | 2/2007 |
| JP | 2007-257888 A | 10/2007 |
| JP | 2008-504957 A | 2/2008 |
| JP | 2008-108594 A | 5/2008 |
| WO | 2009/031383 A1 | 3/2009 |
| WO | 2009/091047 A1 | 7/2009 |

OTHER PUBLICATIONS

Japanese Office Action issued on Jul. 30, 2013 from the Japan Patent Office in Japanese Application No. 2010-505629.

* cited by examiner

PROCESS FOR PRODUCING FUEL CELL CATALYSTS, AND FUEL CELL CATALYST

FIELD OF THE INVENTION

The present invention relates to processes for producing fuel cell catalysts and to fuel cell catalysts.

BACKGROUND OF THE INVENTION

To increase the reaction rate in fuel cells and enhance the energy conversion efficiency, a layer containing a catalyst (hereinafter, also the fuel cell catalyst layer) is conventionally provided on the surface of a cathode (an air electrode) or an anode (a fuel electrode) of a fuel cell.

Noble metals are generally used as the catalysts. Of the noble metals, platinum that is stable at high potential and has high catalytic activity is most frequently used. However, since platinum is expensive and exists in a limited amount, alternative catalysts have been desired.

Further, the noble metals used on a cathode surface are often dissolved in an acidic atmosphere and are not suited in applications requiring long-term durability. Accordingly, it has been strongly demanded that catalysts are developed which are not corroded in an acidic atmosphere and have excellent durability and high oxygen reducing ability.

Materials containing nonmetals such as carbon, nitrogen and boron capture attention as alternative catalysts to platinum. The materials containing these nonmetals are inexpensive compared to noble metals such as platinum and are abundant. Processes for the production of catalysts with such materials have been studied in universities and research institutes.

Nonpatent Document 1 reports that zirconium-based ZrOxN compounds show oxygen reducing ability.

Patent Document 1 discloses, as platinum-alternative materials, oxygen-reducing electrode materials containing a nitride of one or more elements selected from Groups 4, 5 and 14 in the long periodic table.

However, the materials containing these nonmetals do not provide sufficient oxygen reducing ability for practical use as catalysts.

Patent Document 2 discloses an oxycarbonitride obtained by mixing a carbide, an oxide and a nitride and heating the mixture in vacuum or an inert or non-oxidative atmosphere at 500 to 1500° C.

However, the oxycarbonitride disclosed in Patent Document 2 is a thin-film magnetic head ceramic substrate material, and the use of the oxycarbonitride as catalyst is not considered therein.

Meanwhile, platinum is useful not only as a fuel cell catalyst as described above but as a catalyst in exhaust gas treatment or organic synthesis. However, the expensiveness and the limited amount of platinum have created a need of alternative catalysts in these applications too.

Patent Document 3 discloses a process for producing catalyst materials including a step of forming an amorphous material of a metal oxide and a step of crystallizing the metal oxide by heating. Patent Document 3 describes that the metal oxides are used for the oxidation of harmful contaminants in the absence of UV illumination. The use of the metal oxides as fuel cell catalyst materials is not considered.

Patent Document 1: JP-A-2007-31781
Patent Document 2: JP-A-2003-342058
Patent Document 3: JP-A-2008-504957

Nonpatent Document 1: S. Doi, A. Ishihara, S. Mitsushima, N. Kamiya, and K. Ota, Journal of The Electrochemical Society, 154 (3) B362-B369 (2007)

SUMMARY OF THE INVENTION

It is an object of the invention to provide processes for producing fuel cell catalysts having high activity.

The present inventors have found that fuel cell catalysts having higher oxygen reducing ability are produced from transition metal carbonitrides by a process including specific two heating steps. The present invention has been completed based on the finding.

The present invention concerns with the following (1) to (10).

(1) A process for producing fuel cell catalysts, comprising a step (I) of heating a carbonitride of a transition metal in an inert gas containing oxygen, and a step (II) of heating the product from the step (I) in an inert gas that does not substantially contain oxygen.

(2) The process for producing fuel cell catalysts as described in (1), wherein the heating temperature in the step (I) is in the range of 400 to 1200° C.

(3) The process for producing fuel cell catalysts as described in (1) or (2), wherein the heating temperature in the step (II) is in the range of 800 to 1400° C.

(4) The process for producing fuel cell catalysts as described in any one of (1) to (3), wherein the heating temperature in the step (II) is equal to or higher than that in the step (I).

(5) The process for producing fuel cell catalysts as described in any one of (1) to (4), wherein the difference between the heating temperature in the step (II) and that in the step (I) (the heating temperature in the step (II)—the heating temperature in the step (I)) is not less than 1° C.

(6) The process for producing fuel cell catalysts as described in any one of (1) to (5), wherein the inert gas in the step (I) has an oxygen concentration in the range of 0.1 to 10% by volume.

(7) The process for producing fuel cell catalysts as described in any one of (1) to (6), wherein the inert gas in the step (I) contains hydrogen at a concentration of not more than 4% by volume.

(8) The process for producing fuel cell catalysts as described in any one of (1) to (7), wherein the inert gas in the step (II) has an oxygen concentration of not more than 10 ppm.

(9) The process for producing fuel cell catalysts as described in any one of (1) to (8), wherein the transition metal is niobium.

(10) A fuel cell catalyst produced by the process described in any one of (1) to (9).

Advantageous Effects of the Invention

The fuel cell catalysts obtained by the production processes according to the invention are stable and are not corroded in acidic electrolytes or at high potential, have high oxygen reducing ability and are inexpensive compared to platinum. Fuel cells having the catalysts are therefore relatively inexpensive and have high performance.

Figure 1:
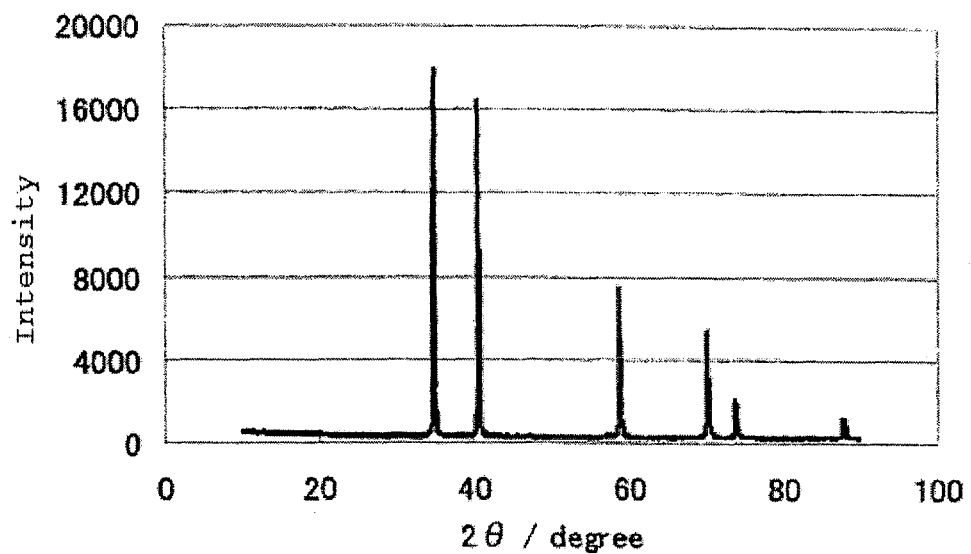
FIG. 1 is a powder X-ray diffraction spectrum of niobium carbonitride used in Example 1.

PREFERRED EMBODIMENTS FOR CARRYING OUT THE INVENTION (Processes for Producing Fuel Cell Catalysts)

Processes for producing fuel cell catalysts according to the present invention include a step (I) of heating a carbonitride of a transition metal in an inert gas containing oxygen, and a step (II) of heating the product from the step (I) in an inert gas that does not substantially contain oxygen. Examples of the transition metals include niobium, titanium and zirconium. The transition metal is preferably niobium. The fuel cell catalysts obtained by the production processes including the steps (I) and (II) are stable and are not corroded in acidic electrolytes or at high potential, and have high oxygen reducing ability. The fuel cell catalysts according to the invention may be manufactured at low cost compared to fuel cell platinum catalysts.

The steps (I) and (II) will be described below.

[Step (I)]

In the step (I), a carbonitride of a transition metal is heated in an inert gas containing oxygen. Through the step (I), the transition metal carbonitride is considered to be oxidized.

The heating temperature in the step (I) is preferably in the range of 400 to 1200° C., and more preferably 800 to 1000° C. The heating temperature in this range ensures that the oxidation of the transition metal carbonitride takes place appropriately. If the heating temperature is below 400° C., the oxidation tends not to proceed. Heating at a temperature exceeding 1200° C. tends to result in excessive oxidation.

Examples of the inert gases for use in the step (I) include nitrogen gas, helium gas, neon gas, argon gas, krypton gas, xenon gas and radon gas. Nitrogen gas and argon gas are particularly preferred because of relatively easy availability. The inert gases may be used singly, or two or more kinds may be used in combination.

In the step (I), the oxygen concentration in the inert gas depends on the heating time and the heating temperature, but is preferably in the range of 0.1 to 10% by volume, and particularly preferably 0.1 to 5% by volume. This oxygen concentration ensures that the transition metal carbonitride is oxidized appropriately. If the oxygen concentration is below 0.1% by volume, an unoxidized product tends to result.

The inert gas preferably contains hydrogen gas at not more than 4% by volume. The content of the hydrogen gas depends on the heating time and the heating temperature, but is more preferably in the range of 0.01 to 4% by volume, and still more preferably 0.1 to 4% by volume. The content of the hydrogen gas is preferably not more than 4% by volume because the presence of hydrogen in excess of 4% by volume increases the risk of explosion. When the inert gas contains hydrogen gas in the above range, the obtainable final fuel cell catalysts tend to achieve high oxygen reducing ability. In the invention, the gas content (% by volume) is determined under standard conditions.

The heating may be performed by a method such as a standing method, a stirring method, a dropping method or a powder capturing method.

In the dropping method, an induction furnace is heated to a predetermined heating temperature while flowing an inert gas containing a trace amount of oxygen through the furnace; a thermal equilibrium is maintained at the temperature and the transition metal carbonitride is dropped and heated in a crucible which is a heating zone in the furnace. The dropping methods provide advantages that the aggregation and growth of particles of the transition metal carbonitride are minimized.

In the powder capturing method, the transition metal carbonitride is caused to suspend as particles in an inert gas containing a trace amount of oxygen, and the transition metal carbonitride is captured and heated in a vertical tubular furnace controlled at a predetermined heating temperature.

In the dropping method, the heating time for the transition metal carbonitride is usually from 0.5 to 10 minutes, and preferably from 0.5 to 3 minutes. This heating time tends to ensure that the transition metal carbonitride is oxidized appropriately. The heating for less than 0.5 minute tends to result in partial oxidation of the transition metal carbonitride. If the heating time exceeds 10 minutes, the oxidation tends to proceed excessively.

In the powder capturing method, the heating time for the transition metal carbonitride is from 0.2 second to 1 minute, and preferably from 0.2 to 10 seconds. This heating time tends to ensure that the transition metal carbonitride is oxidized appropriately. The heating for less than 0.2 second tends to result in partial oxidation of the transition metal carbonitride. If the heating time exceeds 1 minute, the oxidation tends to proceed excessively.

When the heating is performed in a tubular furnace or a rotary kiln, the heating time for the transition metal carbonitride is from 0.1 to 20 hours, and preferably from 1 to 20 hours. This heating time tends to ensure that the oxidation of the transition metal carbonitride takes place appropriately. The heating for less than 0.1 hour tends to result in partial oxidation of the transition metal carbonitride. If the heating time exceeds 20 hours, the oxidation tends to proceed excessively.

The pressure in the heating in the step (I) is not particularly limited but is preferably ordinary pressure.

[Step (II)]

In the step (II), the product from the step (I) is heated in an inert gas that does not substantially contain oxygen. Through the step (II), the product from the step (I) is considered to be crystallized.

The heating temperature in the step (II) is preferably in the range of 800 to 1400° C., and more preferably 800 to 1200° C.

When the heating temperature is in this range, it is reasonably expected that the product from the step (I) is crystallized appropriately.

The processes according to the invention include the step (II) in addition to the step (I), and the obtainable fuel cell catalysts achieve higher oxygen reducing ability than fuel cell catalysts fabricated without the step (II).

In a preferred embodiment, the heating temperature in the step (II) is equal to or higher than that in the step (I). In a more preferred embodiment, the difference between the heating temperature in the step (II) and that in the step (I) (the heating temperature in the step (II)—the heating temperature in the step (I)) is not less than 1° C., still more preferably in the range of 50 to 400° C., and particularly preferably 200 to 400° C.

Examples of the inert gases for use in the step (II) include nitrogen gas, helium gas, neon gas, argon gas, krypton gas, xenon gas and radon gas. Nitrogen gas and argon gas are particularly preferred because of relatively easy availability. The inert gases may be used singly, or two or more kinds may be used in combination.

The inert gas used in the step (II) does not substantially contain oxygen. By the words "does not substantially contain oxygen", it is meant that the inert gas may contain unavoidable oxygen as impurity. In a preferred embodiment, the inert gas in the step (II) has an oxygen concentration of not more than 10 ppm, and more preferably not more than 1 ppm. In the most preferred embodiment, oxygen does not present in the inert gas. When the oxygen concentration in the step (II) is in the above range, it is reasonably expected that the crystallization of the product from the step (I) takes place appropriately.

The heating in the step (II) may be performed by a method such as a standing method, a stirring method, a dropping method or a powder capturing method.

In the dropping methods, the heating time in the step (II) is usually in the range of 0.5 to 10 minutes, and preferably 5 to 10 minutes. When the heating time is in this range, it is reasonably expected that the product from the step (I) is crystallized appropriately similar to when the oxygen concentration is in the above-described range.

In the powder capturing methods, the heating time in the step (II) is usually in the range of 1 to 10 minutes, and preferably 5 to 10 minutes. When the heating time is in this range, it is reasonably expected that the product from the step (I) is crystallized appropriately.

When the heating is performed in a tubular furnace or a rotary kiln, the heating time in the step (II) is from 0.1 to 20 hours, and preferably from 1 to 20 hours. When the heating time is in this range, it is reasonably expected that the crystallization of the product from the step (I) takes place appropriately.

The pressure in the heating in the step (II) is not particularly limited but is preferably ordinary pressure.

[Crushing Step]

The processes for producing fuel cell catalysts according to the invention may further include a step of crushing the product from the steps (I) and (II). Through the crushing step, finer powdery fuel cell catalysts may be obtained.

The crushing methods include roll milling, ball milling, medium stirring milling, and crushing with an air flow crusher, a mortar or a crushing tank. To crush the fuel cell catalysts into finer particles, an air flow crusher is preferably used. To facilitate the crushing in small amounts, the use of a mortar is preferable.

(Methods for Producing the Transition Metal Carbonitrides)

The transition metal carbonitrides used in the step (I) may be produced by any methods without limitation. In the case where the transition metal is niobium, the following production methods may be employed.

The niobium carbonitride used in the step (I) may be obtained by a method (1) in which a mixture containing niobium oxide and carbon is heated in a nitrogen gas or an inert gas containing nitrogen to give niobium carbonitride; a method (2) in which a mixture containing niobium carbide, niobium oxide and niobium nitride is heated in, for example, a nitrogen gas to give niobium carbonitride; or a method (3) in which a mixture containing niobium carbide and niobium nitride is heated in, for example, a nitrogen gas to give niobium carbonitride.

[Production Method (1)]

In the production method (1), a mixture containing niobium oxide and carbon is heated in a nitrogen gas or an inert gas containing nitrogen to give niobium carbonitride.

The heating to produce the niobium carbonitride is performed at a temperature in the range of 600 to 1800° C., and preferably 800 to 1600° C. This heating temperature tends to ensure that the obtainable niobium carbonitride has high crystallinity and the amount of unreacted materials is small. The heating at temperatures below 600° C. tends to result in niobium carbonitrides having low crystallinity and also low reactivity. Heating temperatures above 1800° C. tend to result in easy sintering.

Examples of the niobium oxides as materials include NbO, $NbO_2$ and $Nb_2O_5$. Any of the niobium oxides may be used, and the obtainable niobium carbonitride from the oxide may be heated according to the processes including the steps (I) and (II) to give fuel cell catalysts having a high oxygen reduction onset potential and high activity.

Examples of the carbons as materials include carbon, carbon blacks, graphites, black leads, activated carbons, carbon nanotubes, carbon nanofibers, carbon nanohorns and fullerenes. The carbon preferably has smaller particle diameters. Such carbon particles have a larger specific surface area and react easily with the oxides. A suitable carbon material is carbon black (specific surface area: 100-300 $m^2/g$, for example XC-72 manufactured by Cabot Corporation).

Appropriate niobium carbonitride may be produced by stoichiometrically controlling the molar ratio of the niobium oxide and the carbon depending on the valence of niobium such as the valence of two, four or five. For example, in the case of niobium (II) oxide, the molar ratio is preferably such that the carbon is used at 1 to 3 mol per 1 mol of the niobium oxide. In the case of niobium (IV) oxide, the molar ratio is preferably such that the carbon is used at 2 to 4 mol per 1 mol of the niobium oxide. In the case of niobium (V) oxide, the molar ratio is preferably such that the carbon is used at 3 to 9 mol per 1 mol of the niobium oxide. If the molar ratio exceeds the upper limit, niobium carbide tends to result. If the molar ratio is below the lower limit, niobium nitride tends to be formed.

[Production Method (2)]

In the production method (2), a mixture containing niobium carbide, niobium nitride and niobium oxide is heated in, for example, a nitrogen gas to give niobium carbonitride.

The heating to produce the niobium carbonitride is performed at a temperature in the range of 600 to 1800° C., and preferably 800 to 1600° C. This heating temperature tends to ensure that the obtainable niobium carbonitride has high crystallinity and the amount of unreacted materials is small. The heating at temperatures below 600° C. tends to result in niobium carbonitrides having low crystallinity and also large amounts of unreacted materials. Heating temperatures above 1800° C. tend to result in easy sintering.

Materials used herein are niobium carbide, niobium nitride and niobium oxide. Examples of the niobium carbides as materials include NbC. Examples of the niobium nitrides as materials include NbN. Examples of the niobium oxides as materials include NbO, $NbO_2$ and $Nb_2O_5$. Any of the niobium oxides may be used, and the obtainable niobium carbonitride from the oxide, niobium carbide and niobium nitride may be heated according to the processes including the steps (I) and (II) to give fuel cell catalysts having a high oxygen reduction onset potential and high activity.

Appropriate niobium carbonitride may be produced by controlling the amounts (the molar ratio) of the niobium carbide, the niobium oxide and the niobium nitride. The amounts (the molar ratio) are usually such that the niobium carbide and the niobium oxide are used at 0.01 to 500 mol and 0.01 to 50 mol, respectively, based on 1 mol of the niobium nitride, and preferably such that the niobium carbide and the niobium oxide are used at 0.1 to 300 mol and 0.1 to 30 mol, respectively, based on 1 mol of the niobium nitride. This molar ratio tends to ensure that the obtainable niobium carbonitride gives catalysts having a high oxygen reduction onset potential and high activity.

[Production Method (3)]

In the production method (3), a mixture containing niobium carbide and niobium nitride is heated in, for example, a nitrogen gas to give niobium carbonitride.

The heating to produce the niobium carbonitride is performed at a temperature in the range of 600 to 1800° C., and preferably 800 to 1600° C. This heating temperature tends to ensure that the obtainable niobium carbonitride has high crystallinity and the amount of unreacted materials is small. The heating at temperatures below 600° C. tends to result in niobium carbonitrides having low crystallinity and also large amounts of unreacted materials. Heating temperatures above 1800° C. tend to result in easy sintering.

Examples of the niobium carbides as materials include NbC. Examples of the niobium nitrides as materials include NbN.

Appropriate niobium carbonitride may be produced by controlling the amounts (the molar ratio) of the niobium carbide and the niobium nitride. The amounts (the molar ratio) are usually such that the niobium carbide is used at 0.01 to 500 mol, and preferably 0.01 to 300 mol, based on 1 mol of the niobium nitride. This molar ratio tends to ensure that the obtainable niobium carbonitride gives catalysts having a high oxygen reduction onset potential and high activity.

<Fuel Cell Catalysts>

Fuel cell catalysts according to the present invention are manufactured by the processes including the step (I) of heating the transition metal carbonitride in an inert gas containing oxygen and the step (II) of heating the product from the step (I) in an inert gas. The fuel cell catalysts obtained by the production processes including the steps (I) and (II) are stable and are not corroded in acidic electrolytes or at high potential, and have high oxygen reducing ability. The fuel cell catalysts of the invention are inexpensive compared to fuel cell platinum catalysts.

The transition metal is preferably niobium. In a preferred embodiment, a fuel cell catalyst prepared from niobium carbonitride shows diffraction peaks, as measured by powder X-ray diffractometry (Cu—Kα radiation), in which the X-ray diffraction intensity at diffraction angles 2θ of 23° to 24° is not less than 1000.

The diffraction peak is a peak that is observed at a specific diffraction angle and a specific diffraction intensity when a sample (crystal) is irradiated with X-rays at various angles. In the invention, the X-ray diffraction intensity is determined by subtracting the intensity at the baseline from the diffraction intensity obtained by the measurement (when the subtraction gives a negative value, the intensity is defined as 0). Here, the intensity at the baseline is the diffraction intensity at a diffraction angle 2θ of 22.0°.

When the transition metal is niobium, the fuel cell catalysts preferably have the compositional formula $NbC_xN_yO_z$ (wherein x, y and z represent a ratio of the numbers of the atoms, $0.01 \le x \le 2$, $0.01 \le y \le 2$, $0.01 \le z \le 3$, and $x+y+z \le 5$). In the compositional formula, it is more preferable that $0.1 \le x \le 1$, $0.1 \le y \le 1$, $0.1 \le z \le 2.9$, and $1 \le x+y+z \le 5$. This ratio of the numbers of the atoms tends to ensure that the obtainable final fuel cell catalysts have a high oxygen reduction potential.

The oxygen reduction onset potential of the fuel cell catalysts in the invention is measured by the measurement method (A) described below. The oxygen reduction onset potential of the fuel cell catalysts is preferably not less than 0.5 V as measured versus a reversible hydrogen electrode (vs. NHE).

[Measurement Method (A)]

The catalyst dispersed in electron conductive carbon particles is added to a solvent such that the catalyst and the carbon particles account for 1% by mass. The mixture is ultrasonically stirred to give a suspension. The carbon source herein is carbon black (specific surface area: 100-300 $m^2/g$) (e.g., XC-72 manufactured by Cabot Corporation), and the catalyst is dispersed therein with a catalyst:carbon mass ratio of 95:5. The solvent is a mixture of isopropyl alcohol:water (=1:1 by mass).

While ultrasonicating the suspension, a 10 μl portion thereof is collected and is quickly dropped on a glassy carbon electrode (diameter: 5.2 mm) and dried to form a fuel cell catalyst layer containing the catalyst on the glassy carbon electrode. The formation of the catalyst layer is repeated until 2 mg of the catalyst layer is attached on the glassy carbon electrode.

Subsequently, 10 μl of Nafion (a 5% Nafion solution (DE521) manufactured by Du Pont Kabushiki Kaisha) diluted ten times with isopropyl alcohol is dropped on the fuel cell catalyst layer and is dried at 60° C. for 1 hour.

The electrode manufactured above is polarized in a 0.5 mol/$dm^3$ sulfuric acid solution at 30° C. under an oxygen atmosphere or a nitrogen atmosphere at a potential scanning rate of 5 mV/sec, thereby recording a current-potential curve. As a reference, a reversible hydrogen electrode is polarized in a sulfuric acid solution of the same concentration. In the current-potential curve, the potential at which the reduction current starts to differ by 0.2 μA/$cm^2$ or more between the polarization under the oxygen atmosphere and that under the nitrogen atmosphere is obtained as the oxygen reduction onset potential.

If the oxygen reduction onset potential is less than 0.7 V (vs. NHE), the use of the catalyst in a fuel cell cathode may cause the generation of hydrogen peroxide. For the oxygen reduction, the oxygen reduction onset potential is preferably 0.85 V (vs. NHE) or above. A higher oxygen reduction onset potential is more preferable. The upper limit of the oxygen reduction onset potential is not particularly limited but is theoretically 1.23 V (vs. NHE).

At a potential of less than 0.4 V (vs. NHE), the compound can exist stably but oxygen cannot be reduced sufficiently. Catalysts having such a low potential are not useful as catalysts in membrane electrode assemblies for fuel cells.

<Uses>

The fuel cell catalysts according to the present invention may be used as catalysts alternative to platinum catalysts.

Fuel cell catalyst layers may be formed using the fuel cell catalysts of the invention.

The fuel cell catalyst layers may be anode catalyst layers or cathode catalyst layers, and the fuel cell catalysts of the invention may be used in any of these layers. Because the fuel cell catalysts have excellent durability and high oxygen reducing ability, they are preferably used in cathode catalyst layers.

In a preferred embodiment, the fuel cell catalyst layers further contain electron conductive particles. When the fuel cell catalyst layers containing the catalyst further contain electron conductive particles, the reduction current may be increased, probably because the electron conductive particles establish electrical contacts with the catalyst to induce electrochemical reaction.

The electron conductive particles are generally used as a carrier for the catalyst.

Examples of the materials forming the electron conductive particles include carbons, conductive polymers, conductive ceramics, metals and conductive inorganic oxides such as tungsten oxide and iridium oxide. These materials may be used singly or in combination with one another. In particular, carbon particles having a large specific surface area or a mixture of carbon particles having a large specific surface area and other electron conductive particles is preferable. That is, the fuel cell catalyst layer according to a preferred embodiment contains the catalyst and carbon particles having a large specific surface area.

Examples of the carbons include carbon blacks, graphites, black leads, activated carbons, carbon nanotubes, carbon nanofibers, carbon nanohorns and fullerenes. If the particle diameter of carbon is excessively small, the carbon may not be able to form an electron conductive path. If the particle diameter is excessively large, the fuel cell catalyst layer tends to reduce gas diffusion properties or the catalyst usage rate tends to be lowered. The carbon particle diameter is preferably in the range of 10 to 1000 nm, and more preferably 10 to 100 nm.

When the electron conductive particles are formed of carbon, the mass ratio of the catalyst and the carbon (catalyst: electron conductive particles) is preferably in the range of 4:1 to 1000:1.

The conductive polymers are not particularly limited. Examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline and polyphenylquinoxaline. Of these, polypyrrole, polyaniline and polythiophene are preferred, and polypyrrole is more preferred.

Polymer electrolytes commonly used in fuel cell catalyst layers may be used without limitation. Specific examples include perfluorocarbon polymers having a sulfonic acid group (such as Nafion (a 5% Nafion solution (DE521) manufactured by Du Pont Kabushiki Kaisha), hydrocarbon polymer compounds having a sulfonic acid group, polymer compounds doped with inorganic acids such as phosphoric acid, organic/inorganic hybrid polymers partially substituted with proton conductive functional groups, and proton conductors composed of a polymer matrix impregnated with a phosphoric acid solution or a sulfuric acid solution. Of these, Nafion (a 5% Nafion solution (DE521) manufactured by Du Pont Kabushiki Kaisha) is preferable.

The fuel cell catalyst layers according to the present invention may be used as anode catalyst layers or cathode catalyst layers. The fuel cell catalyst layers contain the catalyst that has high oxygen reducing ability and is resistant to corrosion in acidic electrolytes at high potential. Accordingly, the catalyst layers of the invention are suited for use in fuel cell cathodes (as cathode catalyst layers). In particular, the catalyst layers are suitably provided in cathodes of membrane electrode assemblies in polymer electrolyte fuel cells.

The catalyst may be dispersed on the electron conductive particles as carriers by methods such as airborne dispersion methods and in-liquid dispersion methods. The in-liquid dispersion methods are preferable because a dispersion of the catalyst and the electron conductive particles in a solvent may be directly used in the formation of the fuel cell catalyst layers. Exemplary in-liquid dispersion methods include an orifice-choked flow method, a rotational shear flow method and an ultrasonic method. The solvents used in the in-liquid dispersion methods are not particularly limited as long as the catalysts or the electron conductive particles are not corroded and are dispersed therein. Volatile liquid organic solvents and water are generally used.

When the fuel cell catalyst is dispersed on the electron conductive particles, the electrolyte described above and a dispersant may be dispersed together.

The fuel cell catalyst layers may be formed by any methods without limitation. For example, a suspension containing the catalyst, the electron conductive particles and the electrolyte may be applied to an electrolyte membrane or a gas diffusion layer as described later. The application methods include dipping, screen printing, roll coating and spraying. In another embodiment, a suspension containing the fuel cell catalyst, the electron conductive particles and the electrolyte may be applied or filtered on a substrate to form a fuel cell catalyst layer, and the fuel cell catalyst layer may be transferred to an electrolyte membrane.

Electrodes may be obtained using the fuel cell catalyst layers. The electrodes preferably have the fuel cell catalyst layer and a porous support layer.

The electrodes may be used as cathodes or anodes. The electrodes have excellent durability and high catalytic performance, and are more suitably used as cathodes.

The porous support layer is a layer which can diffuse gas (hereinafter, also the gas diffusion layer). The gas diffusion layers are not particularly limited as long as they have electron conductivity, high gas diffusion properties and high corrosion resistance. Exemplary gas diffusion layers generally used are carbon-based porous materials such as carbon paper and carbon cloth, and stainless steel and anticorrosive-coated aluminum foils for weight reduction.

Membrane electrode assemblies may be obtained using the electrodes. The membrane electrode assemblies have a cathode, an anode and an electrolyte membrane between the cathode and the anode, and the cathode and/or the anode is the electrode as described hereinabove.

The electrolyte membranes may be general perfluorosulfonic acid electrolyte membranes or hydrocarbon electrolyte membranes. Further, polymer fine-pore membranes impregnated with liquid electrolyte, or porous membranes filled with polymer electrolyte may be used.

The membrane electrode assemblies may be used in fuel cells. The electrode reaction in fuel cells takes place at a three-phase interface (electrolyte-electrode catalyst-reaction gas). The fuel cells are classified according to the electrolytes used, into several types such as molten carbonate fuel cells (MCFC), phosphoric acid fuel cells (PAFC), solid oxide fuel cells (SOFC) and polymer electrolyte fuel cells (PEFC). In particular, the membrane electrode assemblies are preferably used in polymer electrolyte fuel cells.

EXAMPLES

The present invention will be described based on examples hereinbelow without limiting the scope of the invention.

In Examples and Comparative Examples, measurements were carried out by the following methods.

[Analytical Methods]

1. Powder X-ray Diffractometry

Samples were analyzed by powder X-ray diffractometry using X'Pert Pro manufactured by PANalytical.

In the powder X-ray diffractometry of each sample, the number of diffraction peaks was counted in a manner such that a signal which was detected with a signal (S) to noise (N) ratio (S/N) of 2 or more was regarded as a diffraction peak. The X-ray diffraction intensity I was determined by subtracting the intensity at the baseline from the diffraction intensity obtained by the measurement described below (when the subtraction gave a negative value, the intensity was defined as 0). Here, the intensity at the baseline was the diffraction intensity at a diffraction angle $2\theta$ of $22.0°$.

2. Elemental Analysis

Carbon: Approximately 0.1 g of a sample was weighed out and analyzed with EMIA-110 manufactured by HORIBA, Ltd.

Nitrogen and oxygen: Approximately 0.1 g of a sample sealed in a Ni cup was analyzed with an ON analyzer (TC600) manufactured by LECO JAPAN CORPORATION.

Niobium: Approximately 0.1 g of a sample was weighed on a platinum dish, and nitric acid-hydrofluoric acid was added thereto. The sample was then thermally decomposed. The thermal decomposition product was collected to a predetermined volume, diluted and analyzed with ICP-MS (ICP-OES VISTA-PRO) manufactured by SII.

Example 1

1. Preparation of Catalyst

Niobium carbide weighing 4.96 g (81 mmol), niobium oxide weighing 1.25 g (10 mmol) and niobium nitride weighing 0.54 g (5 mmol) were mixed together and sufficiently crushed. The resultant powder mixture was heated in a tubular furnace under nitrogen gas at 1600° C. for 3 hours to give 2.70 g of niobium carbonitride. The product had been sintered, and was therefore crushed in a mortar.

FIG. 1 shows a powder X-ray diffraction spectrum of the niobium carbonitride. The results of elemental analysis of the niobium carbonitride are shown in Table 1.

The niobium carbonitride in an amount of 0.06 g was heated (first heating step) in the tubular furnace at 400° C. for 2 hours while passing an argon gas containing 0.2% by volume of oxygen gas, thereby producing a product (1). Further, the product was heated (second heating step) in the tubular furnace under an argon gas (oxygen gas concentration: not more than 10 ppm) at 800° C. for 1 hour, thereby producing a catalyst (1).

Figure 2:
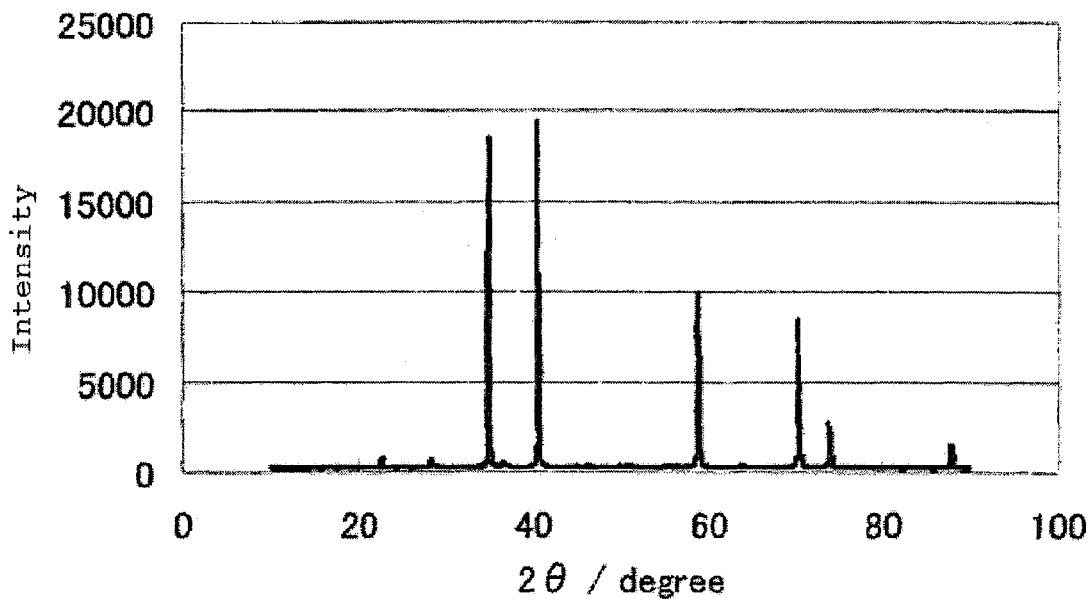
FIG. 2 is a powder X-ray diffraction spectrum of a catalyst (1) in Example 1.

FIG. 2 shows a powder X-ray diffraction spectrum of the catalyst (1). A diffraction peak assigned to niobium oxide was observed at diffraction angles $2\theta$ of $23°$ to $33°$. The results of elemental analysis of the catalyst (1) are shown in Table 2.

2. Production of Fuel Cell Electrode

The oxygen reducing ability was determined in the following manner. The catalyst (1) in an amount of 0.02375 g and carbon (XC-72 manufactured by Cabot Corporation) weighing 0.00125 g were added to 2.5 g of a solution consisting of isopropyl alcohol:pure water=1:1 (mass ratio). The mixture was ultrasonically stirred to give a suspended mixture. The mixture in a volume of 10 µl was applied on a glassy carbon electrode (diameter: 5.2 mm, manufactured by Tokai Carbon Co., Ltd.) and was dried. This procedure was repeated until 2 mg of the catalyst layer was formed on the electrode. Subsequently, 10 µl of Nafion (a 5% Nafion solution (DE521) manufactured by Du Pont Kabushiki Kaisha) diluted ten times with isopropyl alcohol was applied thereon and was dried at 60° C. for 1 hour. A fuel cell electrode (1) was thus manufactured.

3. Evaluation of Oxygen Reducing Ability

The fuel cell electrode (1) manufactured above was evaluated for catalytic performance (oxygen reducing ability) as described below.

The fuel cell electrode (1) was polarized in a 0.5 mol/dm³ sulfuric acid solution at 30° C. under an oxygen atmosphere or a nitrogen atmosphere at a potential scanning rate of 5 mV/sec, thereby recording a current-potential curve. As a reference, a reversible hydrogen electrode was polarized in a sulfuric acid solution of the same concentration.

In the current-potential curve obtained, the potential at which the reduction current started to differ by 0.2 µA/cm² or more between the polarization under the oxygen atmosphere and that under the nitrogen atmosphere was obtained as the oxygen reduction onset potential. The difference between the reduction currents was obtained as the oxygen reduction current.

The oxygen reducing ability of the fuel cell electrode (1) was evaluated based on the oxygen reduction onset potential and the oxygen reduction current. The higher the oxygen reduction onset potential and the higher the oxygen reduction current, the higher the oxygen reducing ability of the fuel cell electrode (1).

Figure 8:
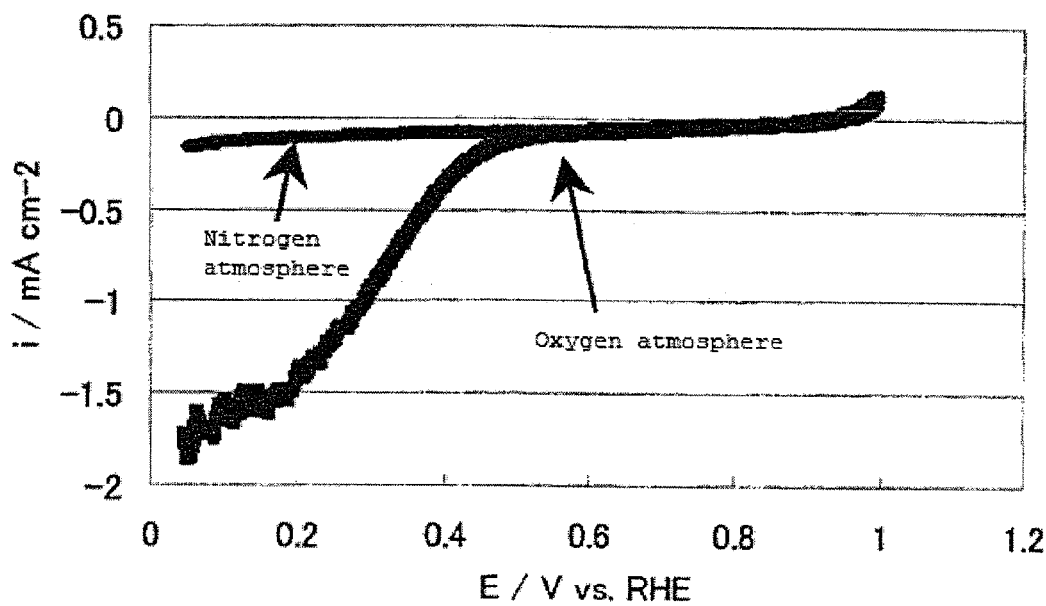
FIG. 8 is a graph showing an evaluation of the oxygen reducing ability of a fuel cell electrode (1) in Example 1.

The current-potential curve recorded during the above measurement is shown in FIG. 8. The fuel cell electrode (1) manufactured in Example 1 had an oxygen reduction onset potential of 0.60 V (vs. NHE), and was found to have high oxygen reducing ability.

Example 2

1. Preparation of Catalyst

Niobium carbonitride was prepared as described in Example 1. The niobium carbonitride in an amount of 0.10 g was heated (first heating step) in a tubular furnace at 800° C. for 1 hour while passing an argon gas containing 1% by volume of oxygen gas, thereby producing a product (2). Further, the product (2) was heated (second heating step) under an argon gas (oxygen gas concentration: not more than 10 ppm) at 900° C. for 5 hours, thereby producing a catalyst (2).

Figure 3:
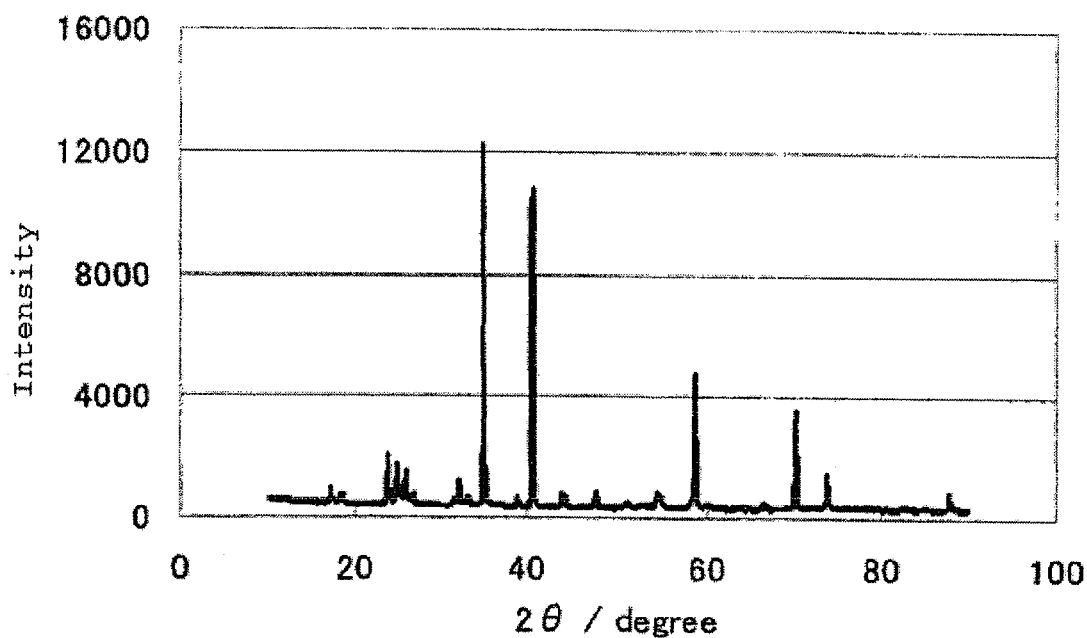
FIG. 3 is a powder X-ray diffraction spectrum of a catalyst (2) in Example 2.

FIG. 3 shows a powder X-ray diffraction spectrum of the catalyst (2). The results of elemental analysis of the catalyst (2) are shown in Table 2. The powder X-ray diffraction spectrum showed a diffraction peak assigned to niobium oxide at diffraction angles $2\theta$ of $23°$ to $33°$.

2. Production of Fuel Cell Electrode

A fuel cell electrode (2) was produced in the same manner as in Example 1, except that the catalyst (2) was used.

3. Evaluation of Oxygen Reducing Ability

Figure 9:
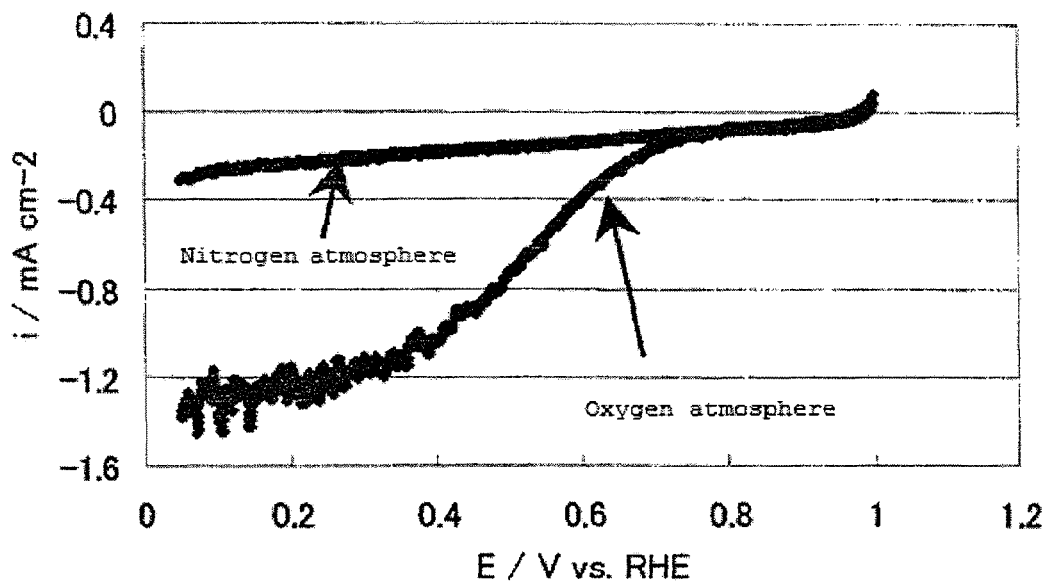
FIG. 9 is a graph showing an evaluation of the oxygen reducing ability of a fuel cell electrode (2) in Example 2.

The fuel cell electrode (2) was evaluated for oxygen reducing ability as described in Example 1. The current-potential curve recorded during the measurement is shown in FIG. 9. The fuel cell electrode (2) manufactured in Example 2 had an oxygen reduction onset potential of 0.80 V (vs. NHE), and was found to have high oxygen reducing ability.

Example 3

1. Preparation of Catalyst

Niobium carbonitride was prepared as described in Example 1. The niobium carbonitride in an amount of 0.50 g was heated (first heating step) in a rotary kiln at 950° C. for 2 hours while passing an argon gas containing 0.5% by volume of oxygen gas, thereby producing a product (3). Further, the product (3) was heated (second heating step) under an argon gas (oxygen gas concentration: not more than 10 ppm) at 950° C. for 15 hours, thereby producing a catalyst (3).

Figure 4:
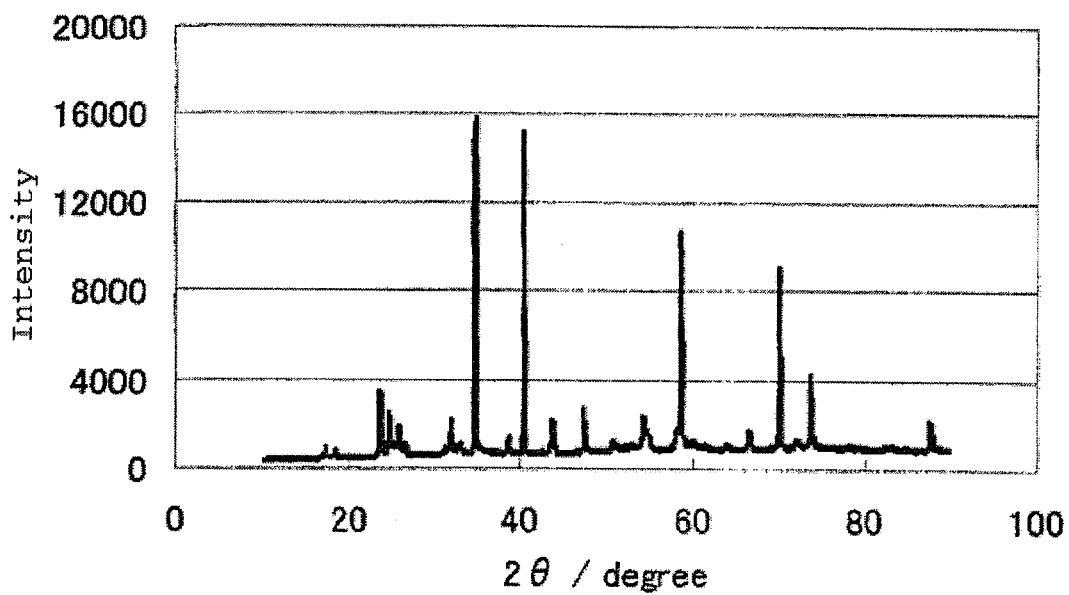
FIG. 4 is a powder X-ray diffraction spectrum of a catalyst (3) in Example 3.

FIG. 4 shows a powder X-ray diffraction spectrum of the catalyst (3). The results of elemental analysis of the catalyst (3) are shown in Table 2. The powder X-ray diffraction spectrum showed a diffraction peak assigned to niobium oxide at diffraction angles 2θ of 23° to 33°.

2. Production of Fuel Cell Electrode

A fuel cell electrode (3) was produced in the same manner as in Example 1, except that the catalyst (3) was used.

3. Evaluation of Oxygen Reducing Ability

Figure 10:
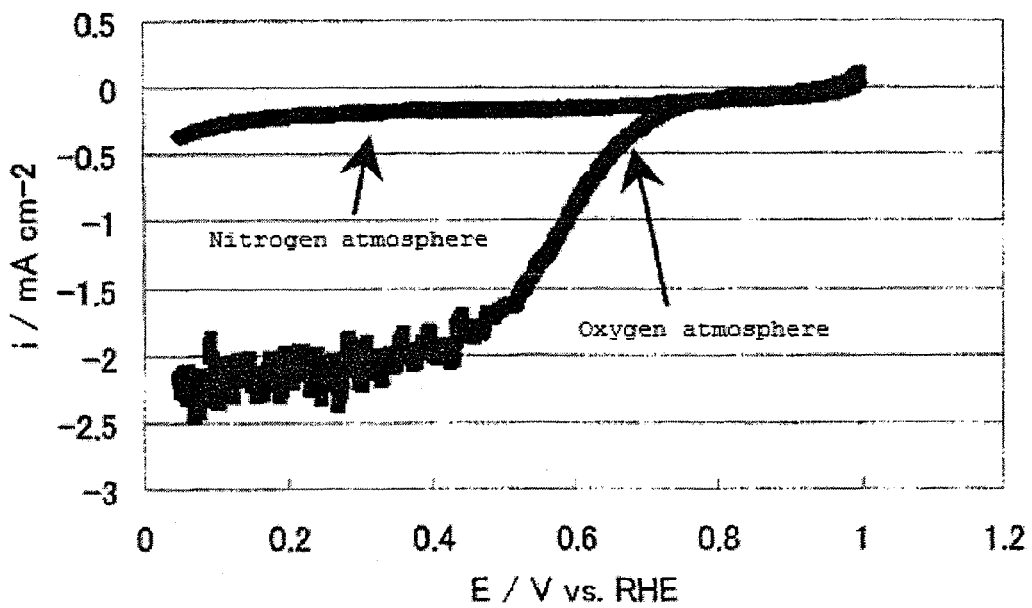
FIG. 10 is a graph showing an evaluation of the oxygen reducing ability of a fuel cell electrode (3) in Example 3.

The fuel cell electrode (3) was evaluated for oxygen reducing ability as described in Example 1. The current-potential curve recorded during the measurement is shown in FIG. 10. The fuel cell electrode (3) manufactured in Example 3 had an oxygen reduction onset potential of 0.92 V (vs. NHE), and was found to have high oxygen reducing ability.

Reference Example 1

1. Preparation of Catalyst

Niobium carbonitride was prepared as described in Example 1. The niobium carbonitride was subjected to the first heating step in a tubular furnace under the same conditions as in Example 1, thereby producing a catalyst (4).

Figure 5:
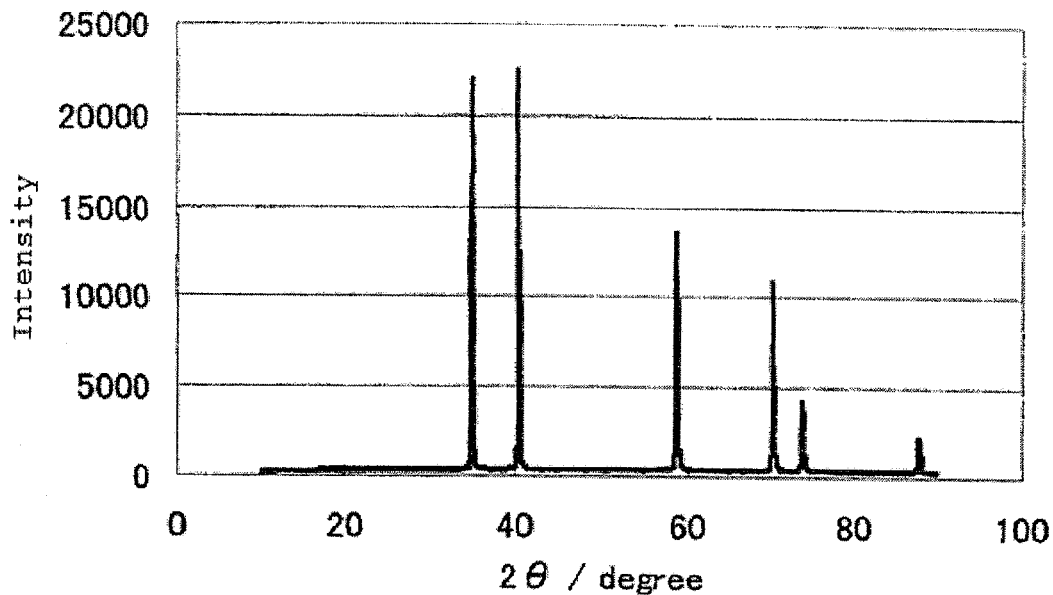
FIG. 5 is a powder X-ray diffraction spectrum of a catalyst (4) in Reference Example 1.

FIG. 5 shows a powder X-ray diffraction spectrum of the catalyst (4). The results of elemental analysis of the catalyst (4) are shown in Table 2. The powder X-ray diffraction spectrum showed no diffraction peak assigned to niobium oxide at diffraction angles 2θ of 23° to 33°, indicating that the catalyst was amorphous.

2. Production of Fuel Cell Electrode

A fuel cell electrode (4) was produced in the same manner as in Example 1, except that the catalyst (4) was used.

3. Evaluation of Oxygen Reducing Ability

Figure 11:
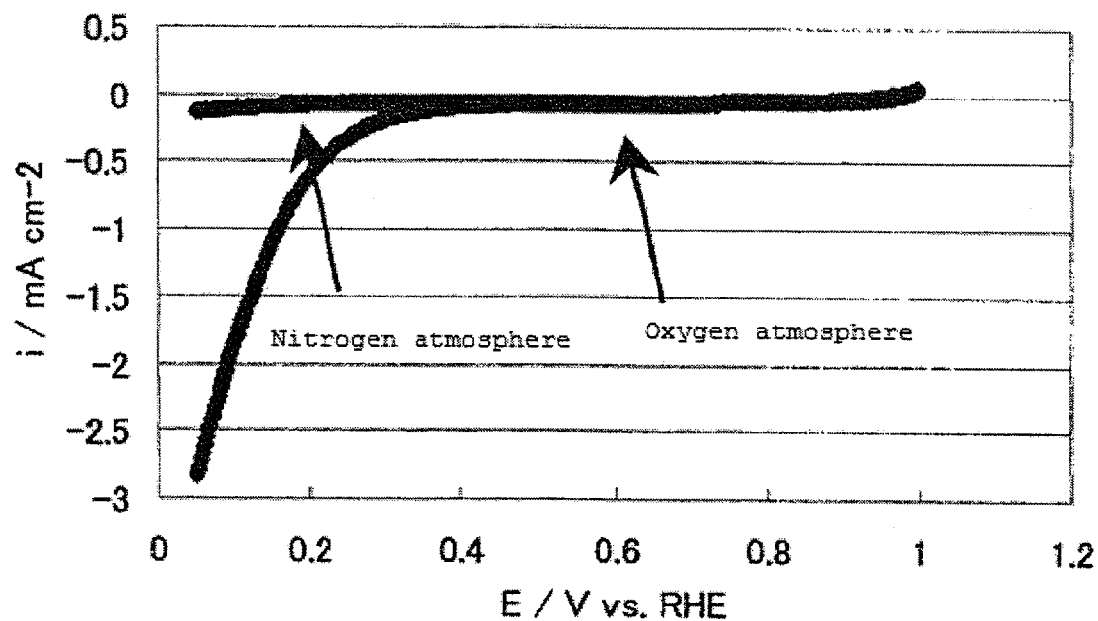
FIG. 11 is a graph showing an evaluation of the oxygen reducing ability of a fuel cell electrode (4) in Reference Example 1.

The fuel cell electrode (4) was evaluated for oxygen reducing ability as described in Example 1. The current-potential curve recorded during the measurement is shown in FIG. 11. The fuel cell electrode (4) manufactured in Reference Example 1 had an oxygen reduction onset potential of 0.43 V (vs. NHE), and was found to be inferior in oxygen reducing ability to the catalyst manufactured with the second heating step (compare with the catalyst (1)).

Reference Example 2

1. Preparation of Catalyst

Niobium carbonitride was prepared as described in Example 1. The niobium carbonitride was subjected to the first heating step in a tubular furnace under the same conditions as in Example 2, thereby producing a catalyst (5).

Figure 6:
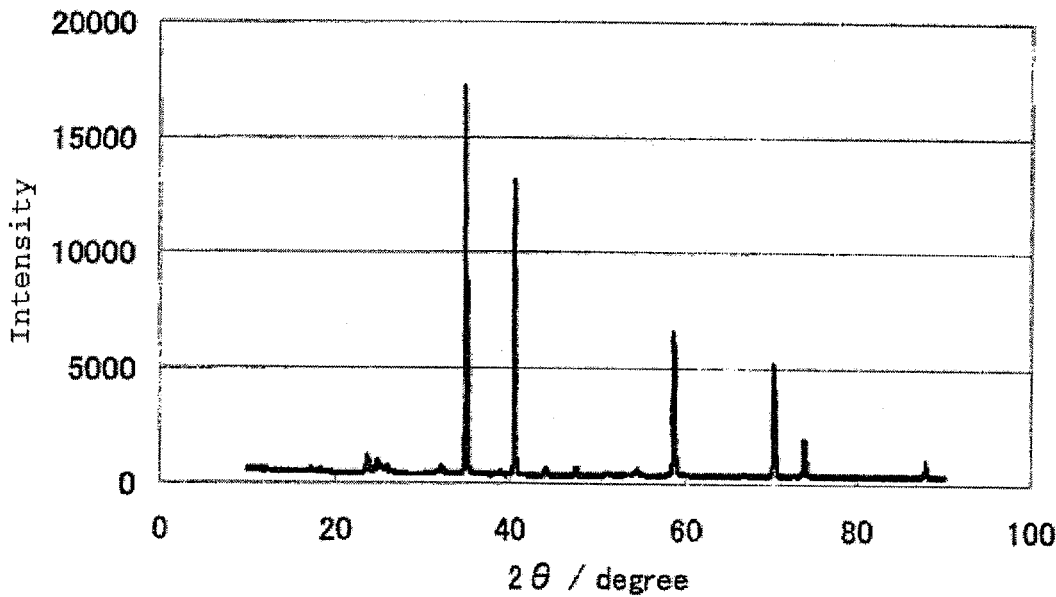
FIG. 6 is a powder X-ray diffraction spectrum of a catalyst (5) in Reference Example 2.

FIG. 6 shows a powder X-ray diffraction spectrum of the catalyst (5). The results of elemental analysis of the catalyst are shown in Table 2. The powder X-ray diffraction spectrum showed that the intensity of diffraction peak assigned to niobium oxide at diffraction angles 2θ of 23° to 33° was lower than that in the catalyst (2).

2. Production of Fuel Cell Electrode

A fuel cell electrode (5) was produced in the same manner as in Example 1, except that the catalyst (5) was used.

3. Evaluation of Oxygen Reducing Ability

Figure 12:
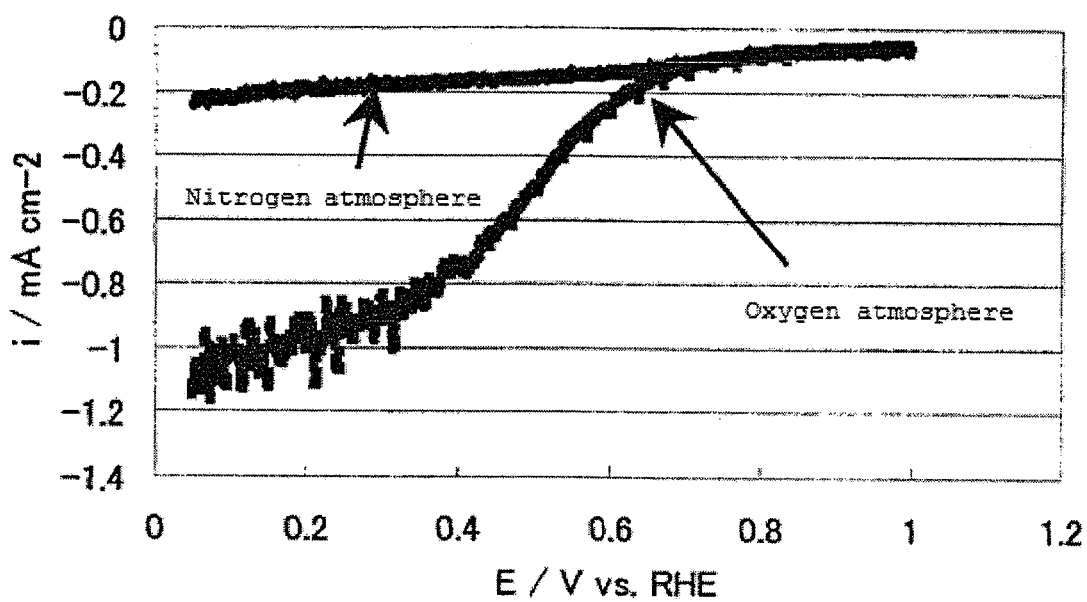
FIG. 12 is a graph showing an evaluation of the oxygen reducing ability of a fuel cell electrode (5) in Reference Example 2.

The fuel cell electrode (5) was evaluated for oxygen reducing ability as described in Example 1. The current-potential curve recorded during the measurement is shown in FIG. 12. The fuel cell electrode (5) manufactured in Reference Example 2 had an oxygen reduction onset potential of 0.74 V (vs. NHE), and was found to be inferior in oxygen reducing ability to the catalyst manufactured with the second heating step (compare with the catalyst (2)).

Reference Example 3

1. Preparation of Catalyst

Niobium carbonitride was prepared as described in Example 1. The niobium carbonitride was subjected to the first heating step in a rotary kiln under the same conditions as in Example 3, thereby producing a catalyst (6).

Figure 7:
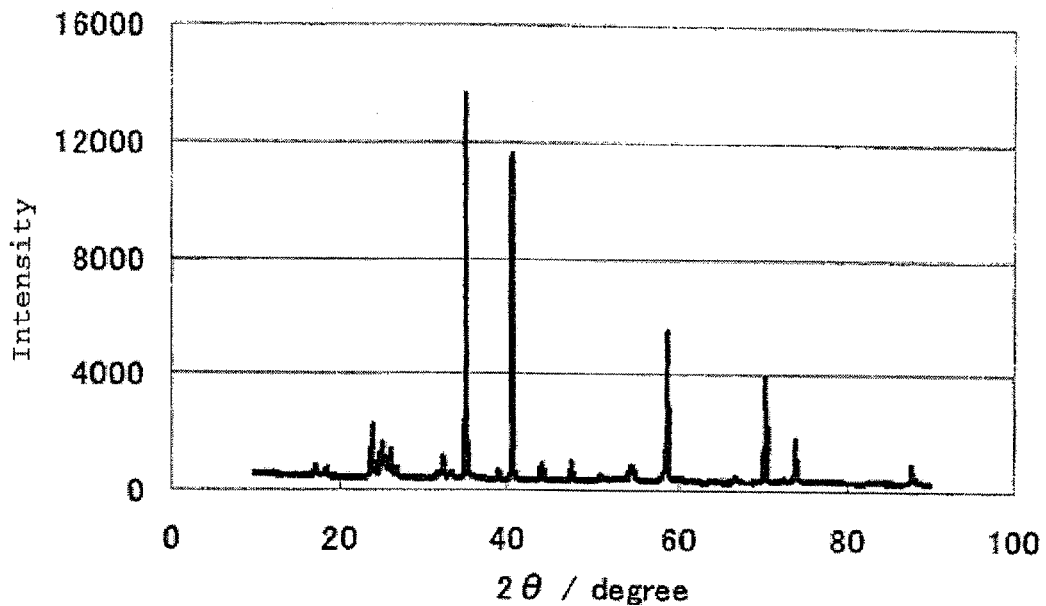
FIG. 7 is a powder X-ray diffraction spectrum of a catalyst (6) in Reference Example 3.

FIG. 7 shows a powder X-ray diffraction spectrum of the catalyst (6). The results of elemental analysis of the catalyst are shown in Table 2. The powder X-ray diffraction spectrum showed that the intensity of diffraction peak assigned to niobium oxide at diffraction angles 2θ of 23° to 33° was lower than that in the catalyst (3).

2. Production of Fuel Cell Electrode

A fuel cell electrode (6) was produced in the same manner as in Example 1, except that the catalyst (6) was used.

3. Evaluation of Oxygen Reducing Ability

Figure 13:
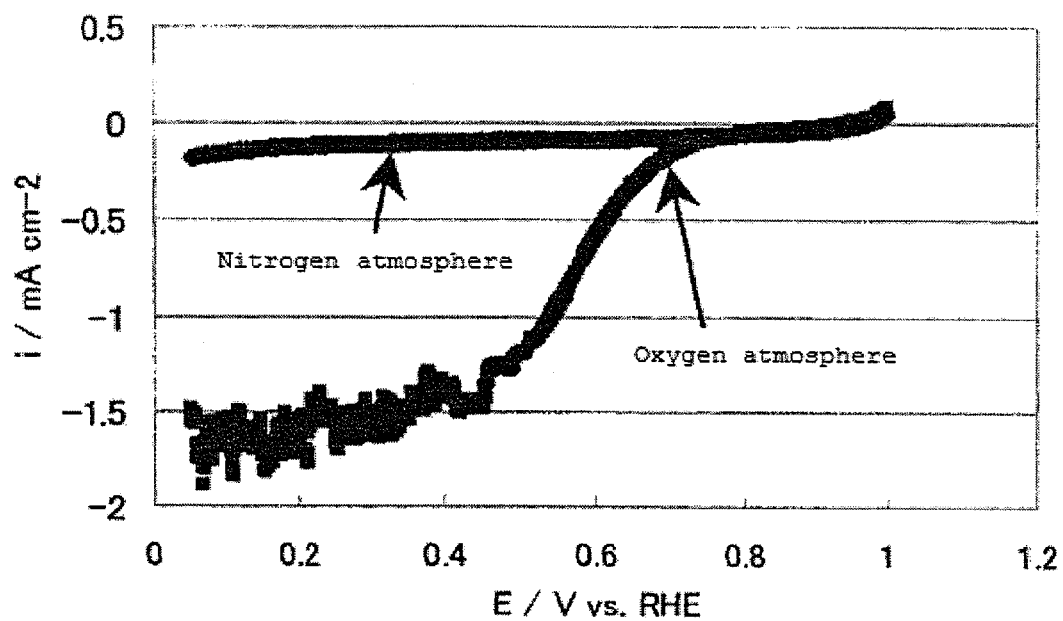
FIG. 13 is a graph showing an evaluation of the oxygen reducing ability of a fuel cell electrode (6) in Reference Example 3.

The fuel cell electrode (6) was evaluated for oxygen reducing ability as described in Example 1. The current-potential curve recorded during the measurement is shown in FIG. 13. The fuel cell electrode (6) manufactured in Reference Example 3 had an oxygen reduction onset potential of 0.87 V (vs. NHE), and was found to be inferior in oxygen reducing ability to the catalyst manufactured with the second heating step (compare with the catalyst (3)).

Comparative Example 1

1. Preparation of Catalyst

Niobium carbonitride (hereinafter, also the catalyst (7)) was prepared as described in Example 1.

2. Production of Fuel Cell Electrode

A fuel cell electrode (7) was produced in the same manner as in Example 1, except that the catalyst (7) was used.

3. Evaluation of Oxygen Reducing Ability

Figure 14:
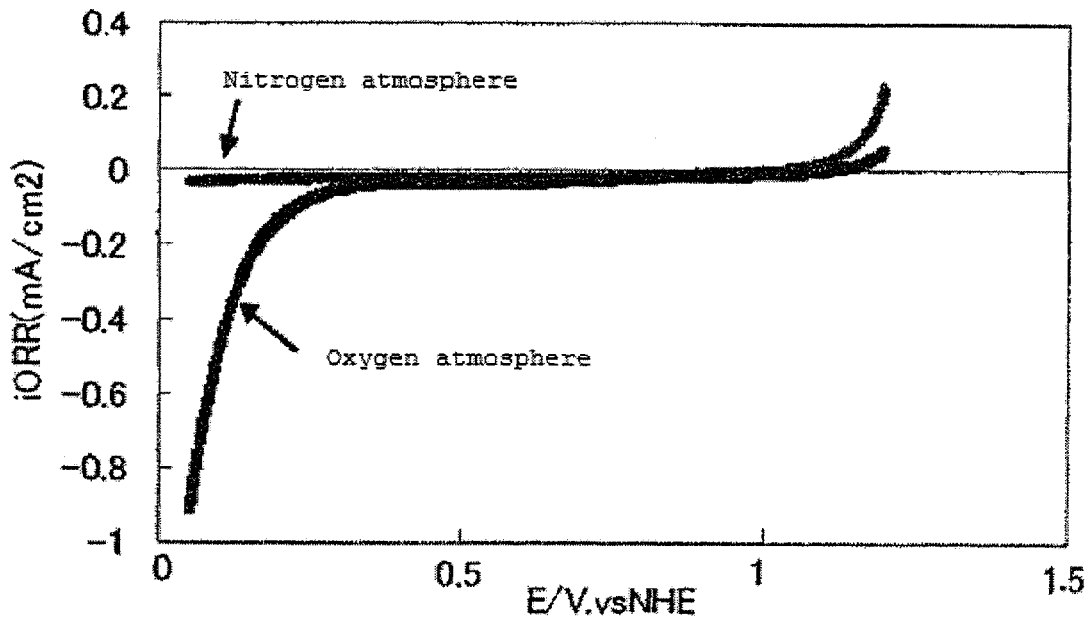
FIG. 14 is a graph showing an evaluation of the oxygen reducing ability of a fuel cell electrode (7) in Comparative Example 1.

The fuel cell electrode (7) was evaluated for oxygen reducing ability as described in Example 1. The current-potential curve recorded during the measurement is shown in FIG. 14. The fuel cell electrode (7) manufactured in Comparative Example 1 had an oxygen reduction onset potential of 0.40 V (vs. NHE), and was found to have low oxygen reducing ability.

TABLE 1

Elemental analysis results of niobium carbonitride (% by mass (The numbers in parentheses indicate the ratio of numbers of atoms relative to Nb.))

| Materials | Nb | C | N | O | Compositional formula |
|---|---|---|---|---|---|
| NbC + NbO$_2$ + NbN | 83.4 (1) | 5.87 (0.52) | 5.53 (0.48) | 0 (0) | NbC$_{0.52}$N$_{0.48}$ |

TABLE 2

Elemental analysis results of catalysts (% by mass (The numbers in parentheses indicate the ratio of numbers of atoms relative to Nb.))

| | Niobium carbonitride | Nb | C | N | O | Compositional formula |
|---|---|---|---|---|---|---|
| Ex. 1 | $NbC_{0.52}N_{0.48}$ | 85.2 (1) | 5.6 (0.53) | 5.2 (0.40) | 3.0 (0.20) | $NbC_{0.53}N_{0.40}O_{0.20}$ |
| Ex. 2 | $NbC_{0.52}N_{0.48}$ | 82.4 (1) | 5.8 (0.54) | 4.2 (0.33) | 7.6 (0.53) | $NbC_{0.54}N_{0.33}O_{0.53}$ |
| Ex. 3 | $NbC_{0.52}N_{0.48}$ | 79.2 (1) | 5.5 (0.52) | 3.7 (0.31) | 11.6 (0.84) | $NbC_{0.52}N_{0.31}O_{0.84}$ |
| Ref. Ex. 1 | $NbC_{0.52}N_{0.48}$ | 85.3 (1) | 5.4 (0.51) | 5.0 (0.39) | 3.2 (0.22) | $NbC_{0.51}N_{0.39}O_{0.22}$ |
| Ref. Ex. 2 | $NbC_{0.52}N_{0.48}$ | 82.2 (1) | 5.7 (0.53) | 4.0 (0.31) | 7.7 (0.54) | $NbC_{0.53}N_{0.31}O_{0.54}$ |
| Ref. Ex. 3 | $NbC_{0.52}N_{0.48}$ | 79.2 (1) | 5.4 (0.51) | 3.5 (0.30) | 11.7 (0.84) | $NbC_{0.51}N_{0.30}O_{0.84}$ |

INDUSTRIAL APPLICABILITY

The fuel cell catalysts produced by the processes according to the invention are not corroded in acidic electrolytes or at high potential, and have excellent durability and high oxygen reducing ability. Accordingly, the catalysts are suitably used in fuel cell catalyst layers, electrodes, membrane electrode assemblies and fuel cells.

The invention claimed is:

1. A process for producing fuel cell catalysts, comprising a step (I) of heating a transition metal-carbonitride in an inert gas that has an oxygen concentration in the range of 0.1 to 10% by volume, and a step (II) of heating the product from the step (I) in an inert gas that has an oxygen concentration of not more than 10 ppm, wherein the heating temperature in the step (I) is in the range of 400 to 1200° C., and wherein the heating temperature in the step (II) is in the range of 800 to 1400° C.

2. The process for producing fuel cell catalysts according to claim 1, wherein the heating temperature in the step (II) is equal to or higher than that in the step (I).

3. The process for producing fuel cell catalysts according to claim 1, wherein the difference between the heating temperature in the step (II) and that in the step (I) (the heating temperature in the step (II)—the heating temperature in the step (I)) is not less than 1° C.

4. The process for producing fuel cell catalysts according to claim 1, wherein the inert gas in the step (I) contains hydrogen at a concentration of not more than 4% by volume.

5. The process for producing fuel cell catalysts according to claim 1, wherein the transition metal is niobium.

* * * * *